Feb. 15, 1944.  E. P. DRAKE ET AL  2,341,857
FRUIT PITTING MACHINE
Filed April 11, 1941   16 Sheets-Sheet 1

Inventors
EDWARD P. DRAKE,
FRED J. ALBERTY,
WILLIAM H. KAGLEY,
By Herbert A. Huebner
Attorney

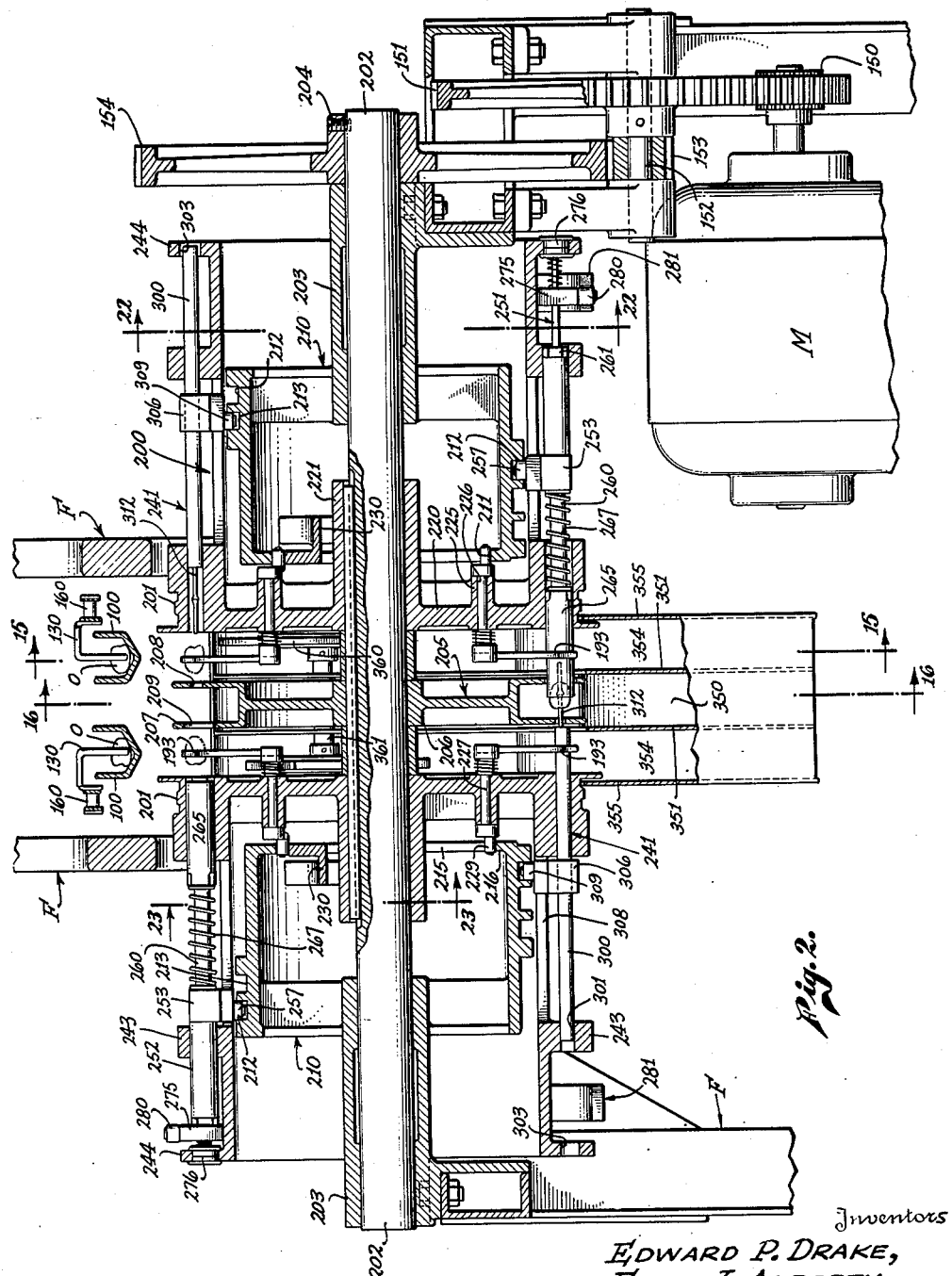

Feb. 15, 1944.   E. P. DRAKE ET AL   2,341,857
FRUIT PITTING MACHINE
Filed April 11, 1941   16 Sheets-Sheet 3
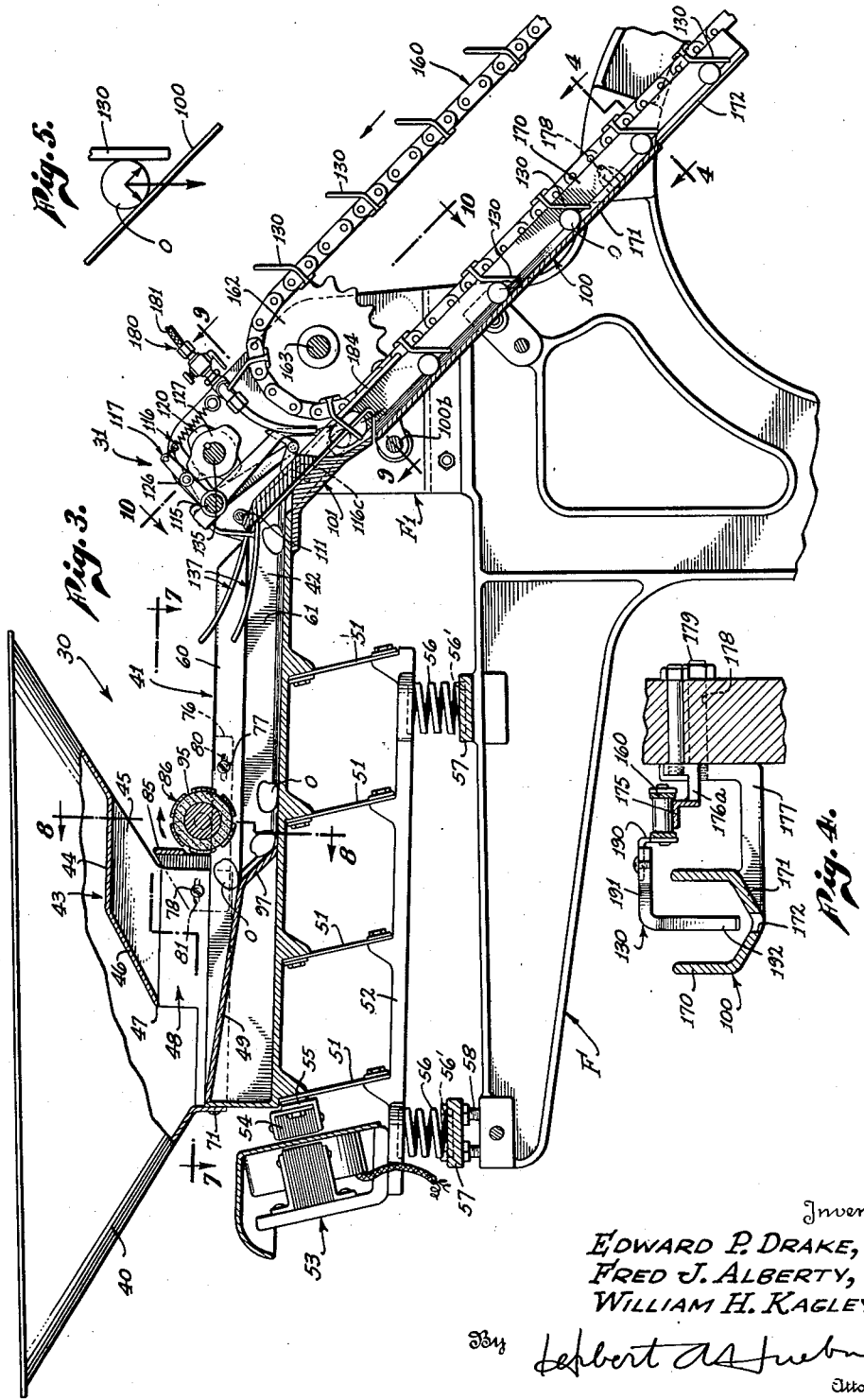
Inventors
EDWARD P. DRAKE,
FRED J. ALBERTY,
WILLIAM H. KAGLEY,
By
Attorney Feb. 15, 1944.　　E. P. DRAKE ET AL　　2,341,857
FRUIT PITTING MACHINE
Filed April 11, 1941　　16 Sheets-Sheet 4

Inventors
EDWARD P. DRAKE,
FRED J. ALBERTY,
WILLIAM H. KAGLEY,
By Herbert A. Huebner
Attorney Feb. 15, 1944.   E. P. DRAKE ET AL   2,341,857
FRUIT PITTING MACHINE
Filed April 11, 1941   16 Sheets-Sheet 5

Inventors
EDWARD P. DRAKE,
FRED J. ALBERTY,
WILLIAM H. KAGLEY,
By Herbert A. Huebner
Attorney Feb. 15, 1944.  E. P. DRAKE ET AL  2,341,857
FRUIT PITTING MACHINE
Filed April 11, 1941  16 Sheets-Sheet 7

Inventors
EDWARD P. DRAKE,
FRED J. ALBERTY,
WILLIAM H. KAGLEY,
By
Attorney

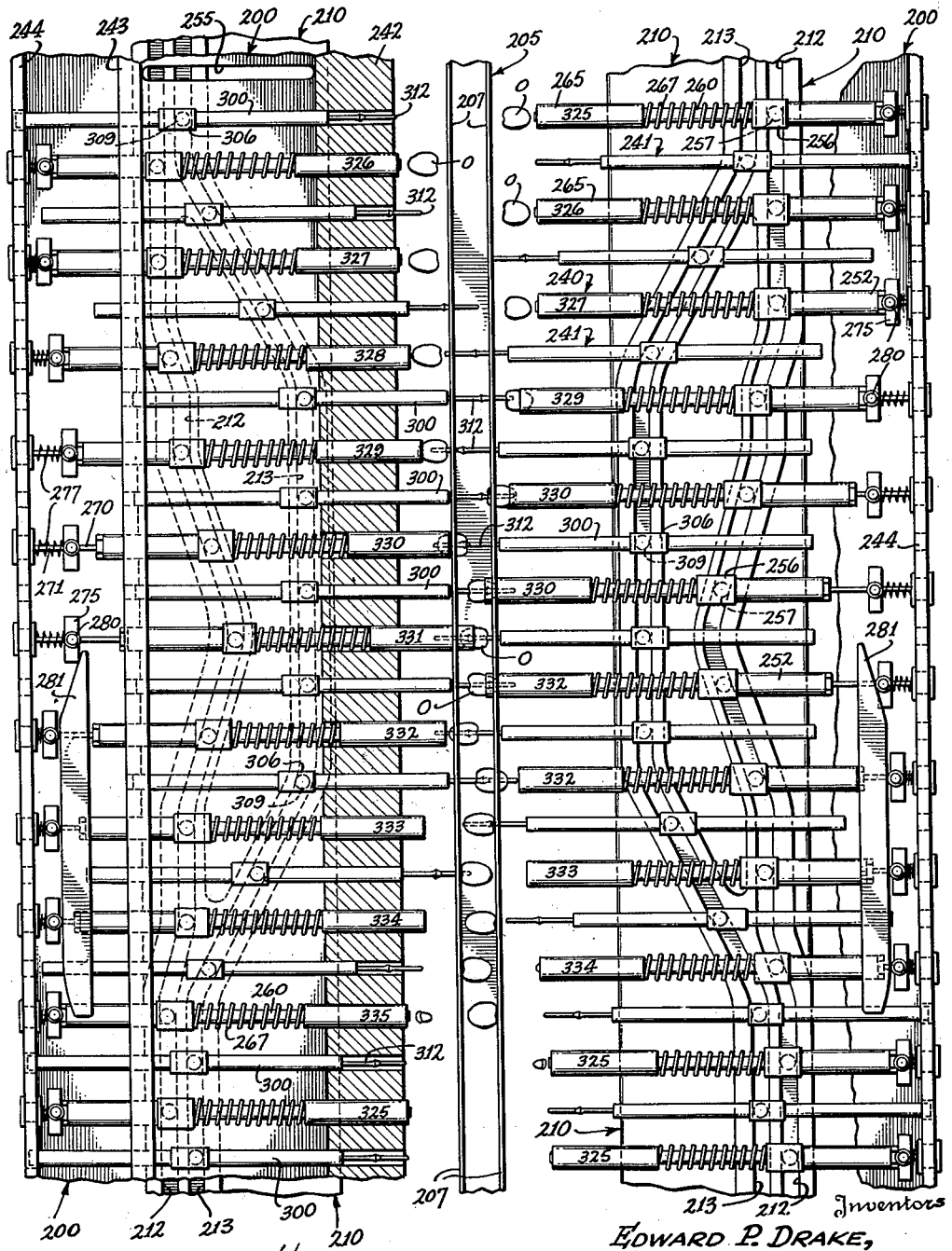

Feb. 15, 1944. E. P. DRAKE ET AL 2,341,857
FRUIT PITTING MACHINE.
Filed April 11, 1941 16 Sheets-Sheet 9
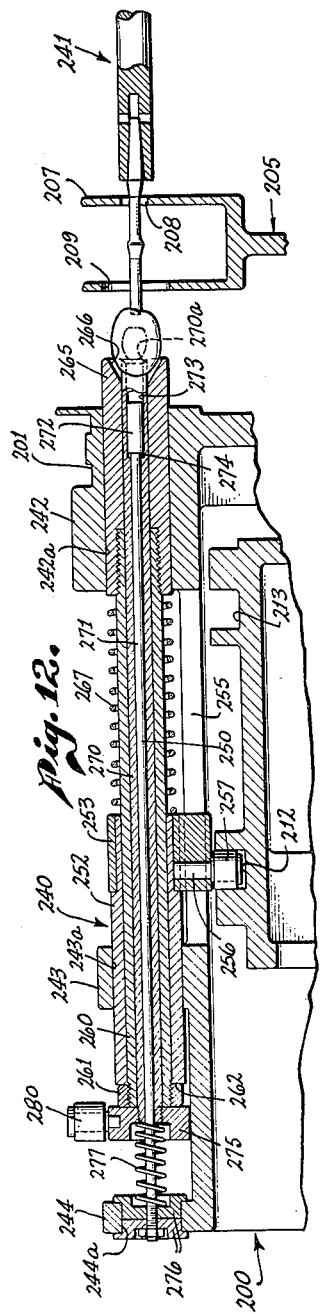
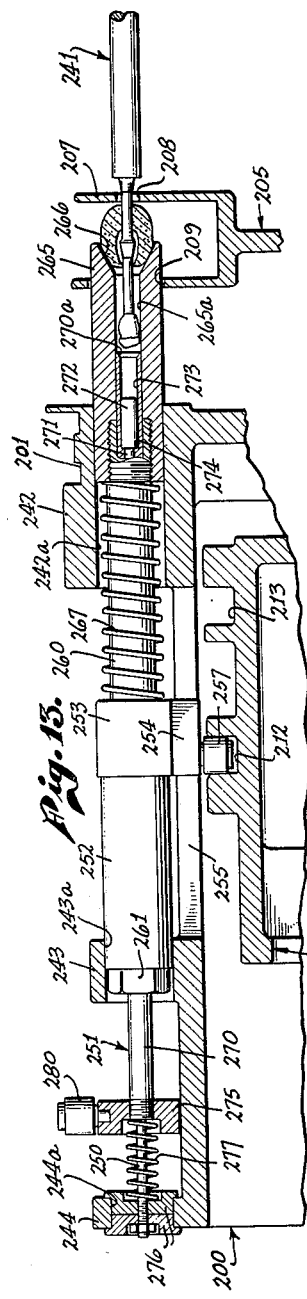
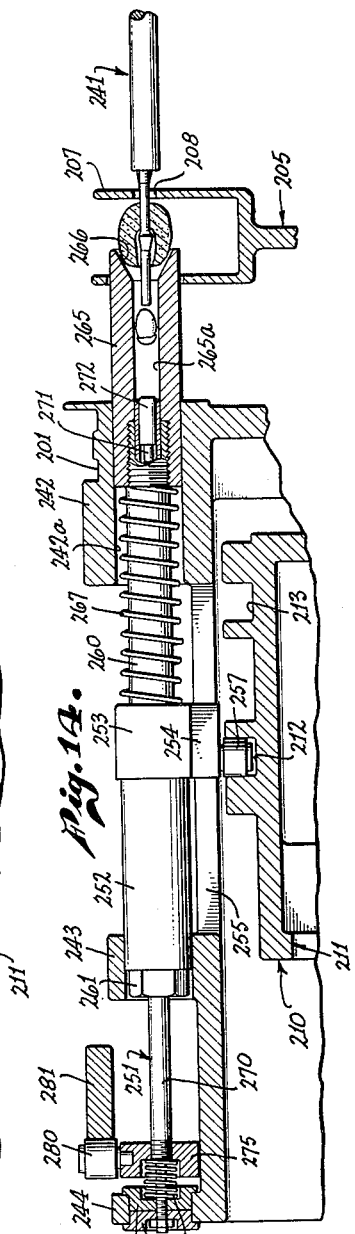
Inventors
EDWARD P. DRAKE,
FRED J. ALBERTY,
WILLIAM H. KAGLEY,
By Hubert A. Hubner
Attorney Feb. 15, 1944.  E. P. DRAKE ET AL  2,341,857
FRUIT PITTING MACHINE
Filed April 11, 1941   16 Sheets-Sheet 10
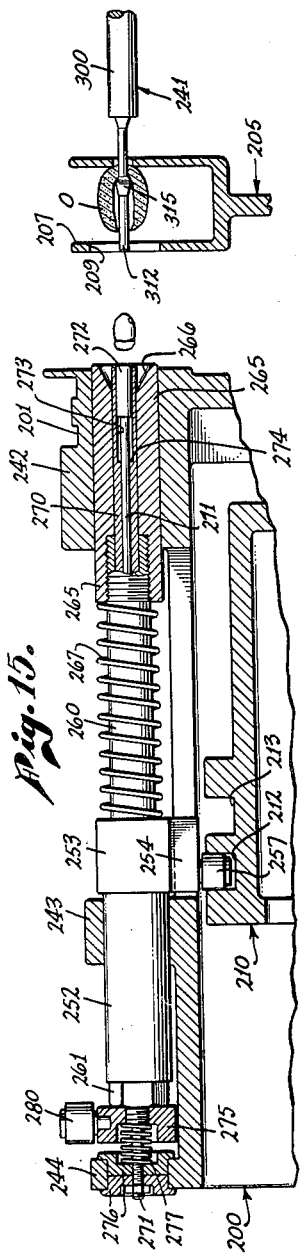
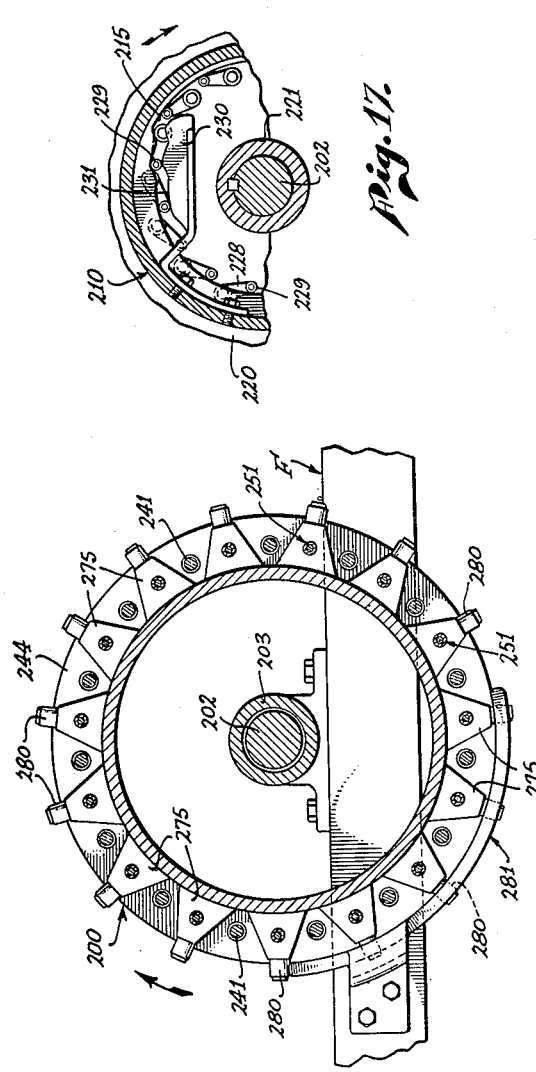
Inventors
EDWARD P. DRAKE,
FRED J. ALBERTY,
WILLIAM H. KAGLEY,
By Herbert A. Huebner
Attorney

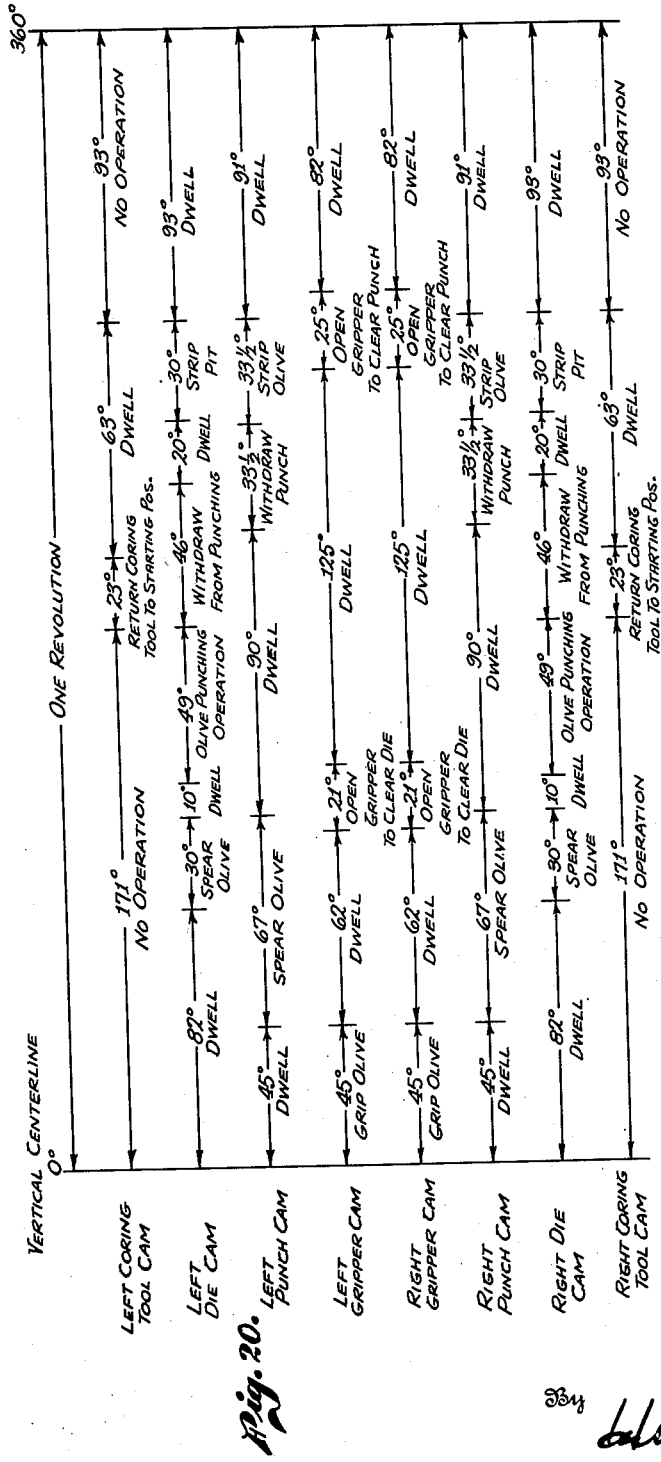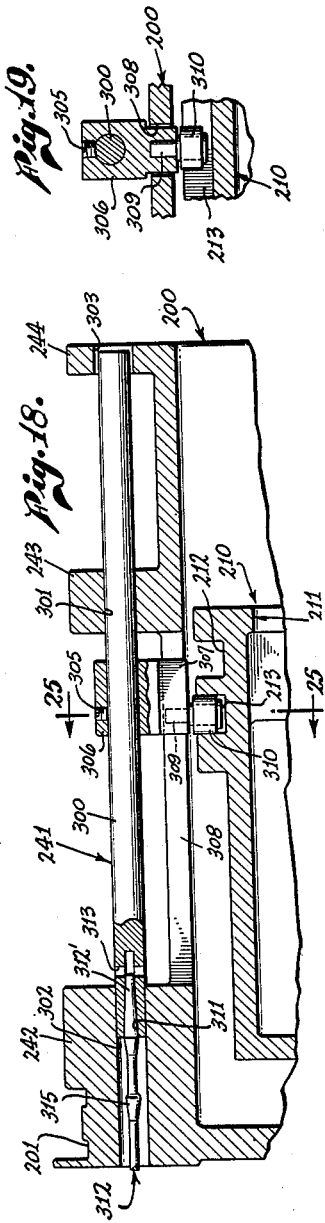

Feb. 15, 1944.  E. P. DRAKE ET AL  2,341,857
FRUIT PITTING MACHINE
Filed April 11, 1941  16 Sheets-Sheet 12
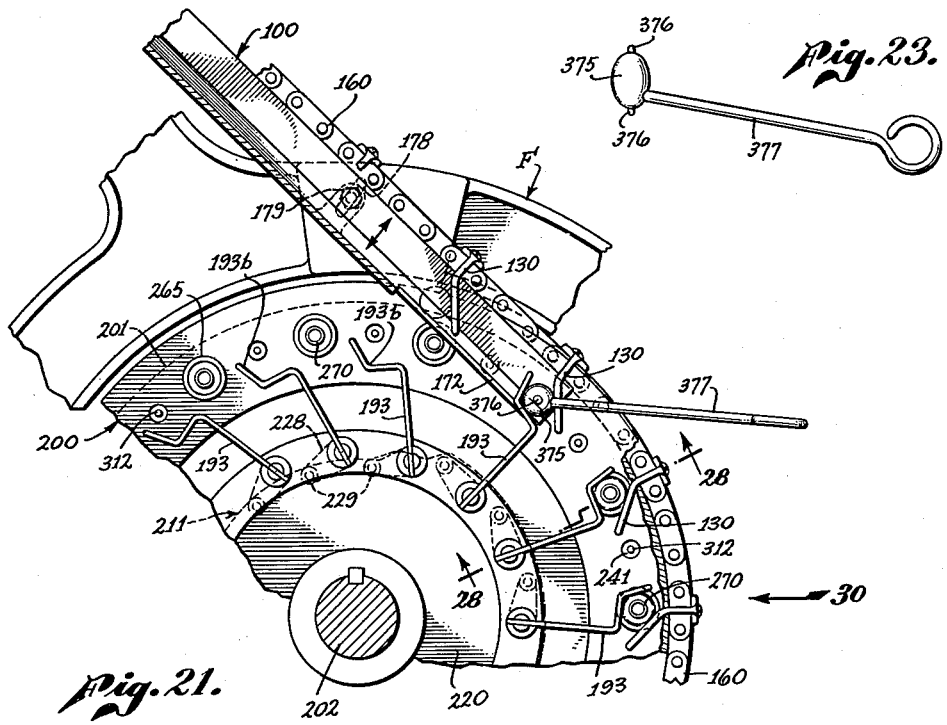
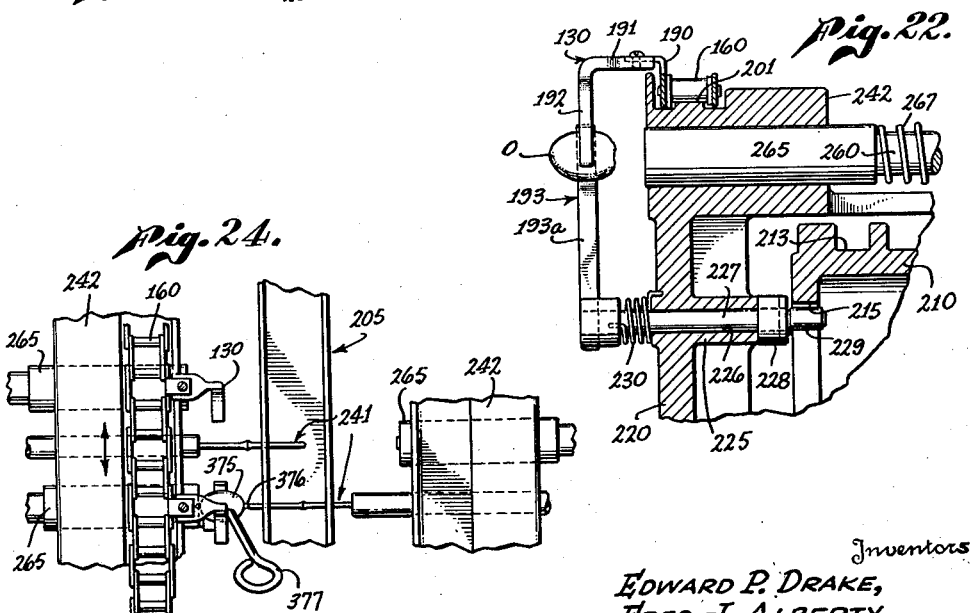
Inventors
EDWARD P. DRAKE,
FRED J. ALBERTY,
WILLIAM H. KAGLEY,
By Herbert A. Huebner
Attorney Inventor
EDWARD P. DRAKE,
FRED J. ALBERTY,
WILLIAM H. KAGLEY,
By Herbert A. Huebner
Attorney

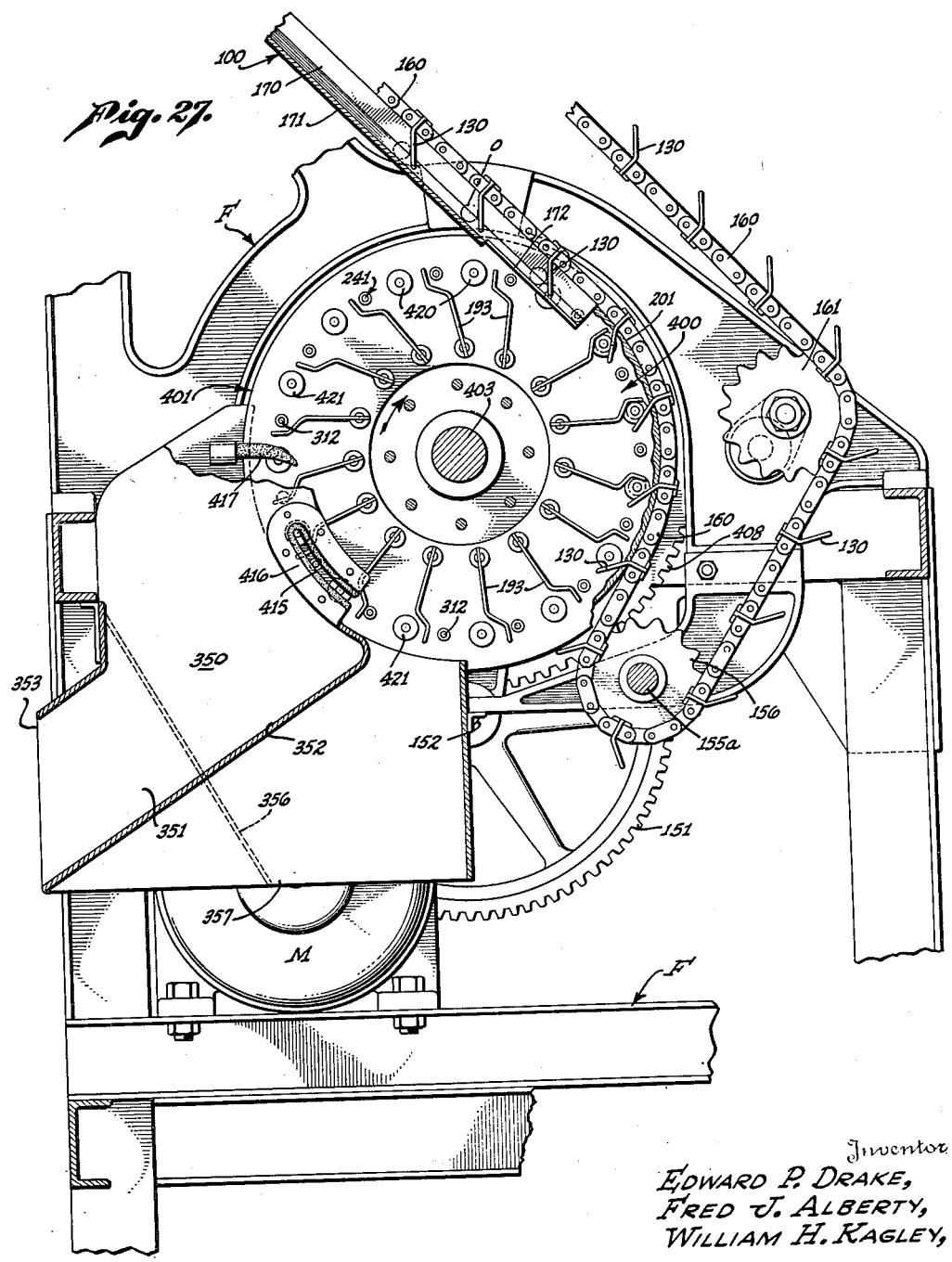

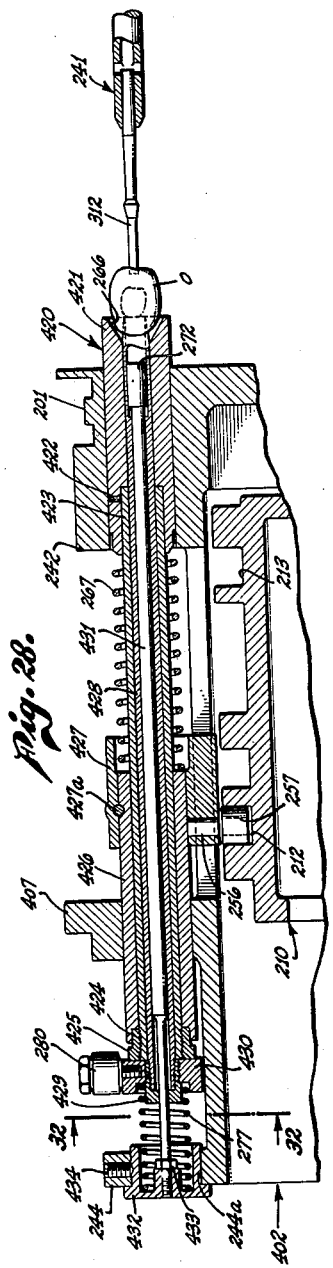
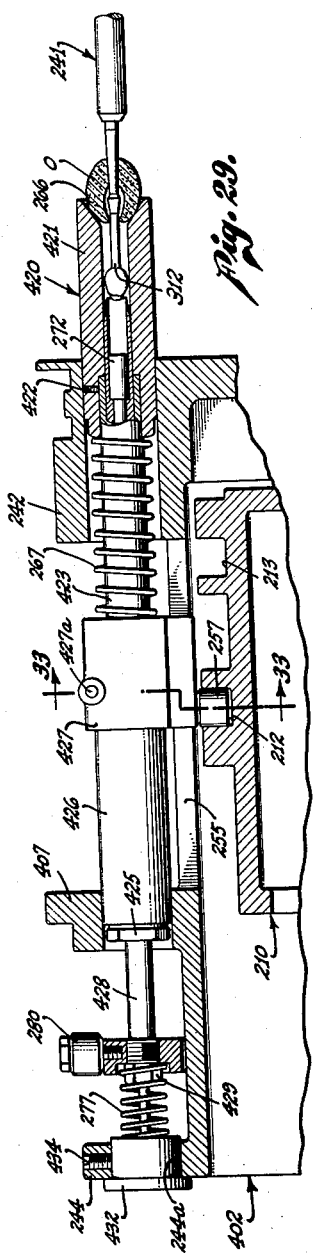
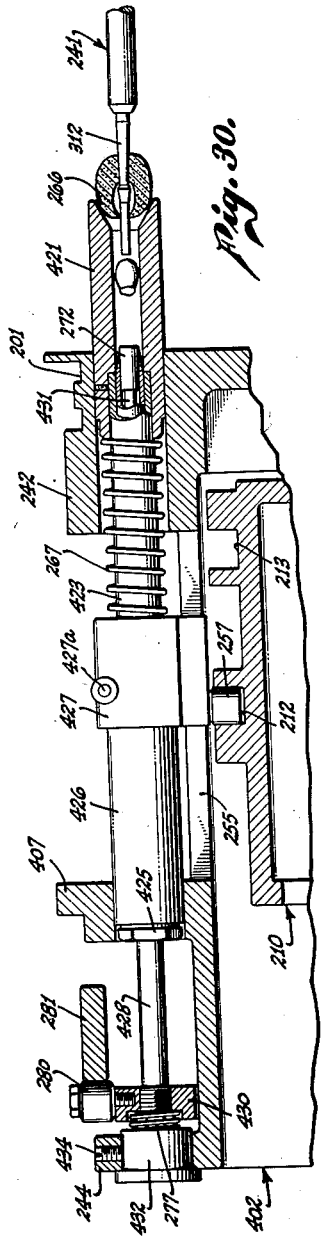

Feb. 15, 1944. E. P. DRAKE ET AL 2,341,857
FRUIT PITTING MACHINE
Filed April 11, 1941 16 Sheets-Sheet 16
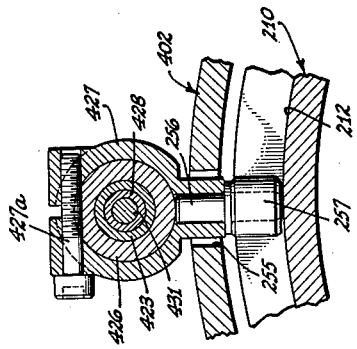
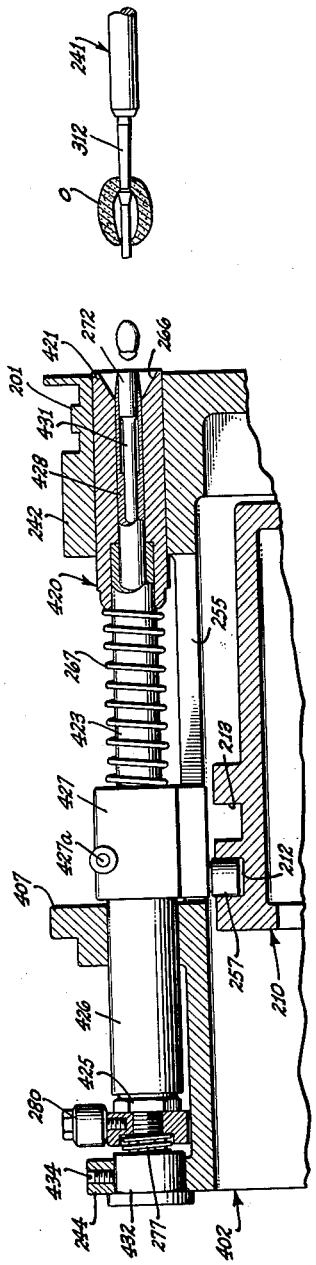
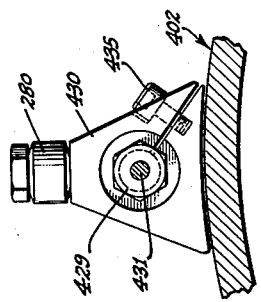
Inventor
EDWARD P. DRAKE,
FRED J. ALBERTY,
WILLIAM H. KAGLEY,
By Herbert A. Huebner
Attorney Patented Feb. 15, 1944

2,341,857

UNITED STATES PATENT OFFICE 2,341,857

FRUIT PITTING MACHINE

Edward P. Drake and Fred J. Alberty, Los Angeles, and William Herbert Kagley, Lindsay, Calif., assignors to Lindsay Ripe Olive Company, Lindsay, Calif., a corporation Application April 11, 1941, Serial No. 388,152

19 Claims. (Cl. 146—27)

This application is for improvements over certain features of the invention described and claimed in United States Letters Patent of Edward P. Drake, No. 2,205,397, granted June 25, 1940, for Automatic pitting machine, and also improvements over the invention disclosed and claimed in the copending application of Edward P. Drake, Serial No. 245,341, filed December 13, 1938, for Automatic olive pitting machine which has matured into Patent No. 2,246,843, granted June 24, 1941. It is a continuation in part of our application Serial No. 322,540, filed March 6, 1940, for Automatic machine for pitting fruit.

This invention relates primarily to the fruit packing industry and more specifically to an automatic machine for pitting fruit such as olives in preparation for packing them in jars or cans. Our machine is adaptable for pitting various kinds of fruit and by our reference to olives as an illustration of its use we do not intend to limit the invention in any way. It will be obvious as the description progresses that certain features of our machine have greatest utility in the handling of olives because of the oblong character of that fruit, but it will also be observed that the same machine or parts thereof may be employed for pitting cherries, plums, apricots, and various other fruits. For convenience, however, in description and to bring out all the features of novelty and utility we will describe the machine in connection with the pitting of olives.

In removing pits from olives it is necessary that each olive be firmly grasped in a predetermined aligned position while a punch enters from one end of the olive and is forced longitudinally therethrough, or the olive is forced against the punch by means of a die, to push the pit out through the end of the olive. In the case of olives the pit may not be struck out through the sides as to do so destroys them for the commercial purposes intended. This is because both olives and pits are oblong.

Previous machines for pitting olives have been introduced. In one of these olives are individually placed by hand in dies which hold the olives during the punching operation. The slowness, expense, and danger to the attendants of such hand fed machines make their use impractical for large scale commercial production. In the U. S. Letters Patent No. 2,205,397 a form of automatic pitting machine is disclosed in which the olives need not be hand fed but are supplied in bulk to a hopper and are fed, aligned, and positioned by the machine for the punching operation. It is believed that that is the first olive pitting machine in which bulk olives are automatically fed directly to the pit ejecting mechanism. In the copending application Serial No. 245,341 certain improvements are disclosed over the earlier machine. The present application utilizes the same basis of design and operation as in the previous application, but contains a number of improvements and refinements as well as certain additional parts which have been found to materially increase the speed and efficiency of the machine. In the present application we also introduce certain modifications which will be described.

An object of the invention is to provide in a machine which is adapted to handle a continuous supply of olives which may be from boxes or any other bulk delivered into a hopper, to transfer from the hopper a continuous flow of olives to a metering device which spaces their subsequent travel, and to position the olives in the region of a die and punch mechanism, a novel die and punch mechanism by which the pits are ejected longitudinally by the combined action of the die and punch, the pitted olives are delivered into one container or accumulator and the pits into another.

Another object of the invention is to provide a novel die and punch mechanism with associated operating parts by which a continuous supply of olives, however previously aligned and fed, may be pitted while the olives are traveling from one part of the machine to another, thus providing for a continuous handling of the olives without interruption in travel from a feeding, metering and aligning mechanism, en route to an accumulator.

Another object is to provide a novel design of die which will accommodate olives of any size.

Another object is to provide a novel coring tool in combination with the die which coring tool advances against the end of an olive and makes an incision therein to facilitate the ejection of the pit through that end of the olive. A further novel and important function of the coring tool in combination with the die and associated elements is to exert a suction for temporarily retaining the pits in the bore of the die to prevent the pits from being prematurely ejected and deposited with the pitted olives.

Other objects and advantages will appear from the further description in the specification and the illustration in the drawings.

In the drawings:

Figure 2 is a somewhat enlarged section taken on the line 2—2 of Figure 1.

Figure 3 is a considerably enlarged side elevation of the hopper, feed, and metering mechanism seen from the side opposite that of Figure 1.

Figure 4 is a fragmentary section taken on line 4—4 of Figure 3 showing parts of the inclined feeding and positioning mechanism.

Figure 5 is a diagrammatic fragmentary view showing the lines of force which occur in the inclined feeding and positioning mechanism.

Figure 11 is a plan with parts in section of the main drum cooperating cam, punches, dies, and coring tools drawn to a hypothetical plan for purposes of illustration.

Figure 12 is a detailed longitudinal section of a die, coring tool, fragment of a punch and immediately associated parts with the parts in positioning just after receiving an olive at which the coring tool has advanced to make a deep incision in the olive.

Figure 13 is a view similar to Figure 12 with the parts in position after the punch has gone through the olive and struck out the pit.

Figure 14 is a similar view in which the coring tool is shown fully retracted.

Figure 15 is another similar view in which the die is shown fully retracted and the punch is shown in the function of stripping the olive.

Figure 16 is a fragmentary section taken on the line 22—22 of Figure 2, particularly illustrating the cam which actuates the coring tool.

Figure 17 is a fragmentary section taken in general on the line 23—23 of Figure 2 illustrating a part of the gripper cam.

Figure 18 is a detailed longitudinal section of a punch and immediately associated mechanism.

Figure 19 is a section of the punch taken on the line 25—25 of Figure 18.

Figure 20 is a chart of the cam action of the cams mounted on the main drum which actuates the dies, punches, coring tools and the grippers.

Figure 21 is a fragmentary enlarged detail of parts shown in Figure 9 particularly illustrating the adjustment of the olive chute for different size olives.

Figure 22 is a fragmentary section taken on the line 28—28 of Figure 21.

Figure 23 is a side view of an adjusting tool.

Figure 24 is a fragmentary view taken in the direction of the arrow 30 in Figure 21, showing especially the use of the adjusting tool for centering the olive between the die and the punch by adjusting the chain.

Figure 27 is a view similar to Figure 9 illustrating the modifications shown in Figure 26.

Figures 28, 29, 30 and 31 are longitudinal sectional views somewhat enlarged illustrating a modified form of punch and die mechanism.

Figure 32 is a fragmentary section taken on the line 32—32 of Figure 28.

Figure 33 is a fragmentary section taken on the line 33—33 of Figure 28.

Figure 1:
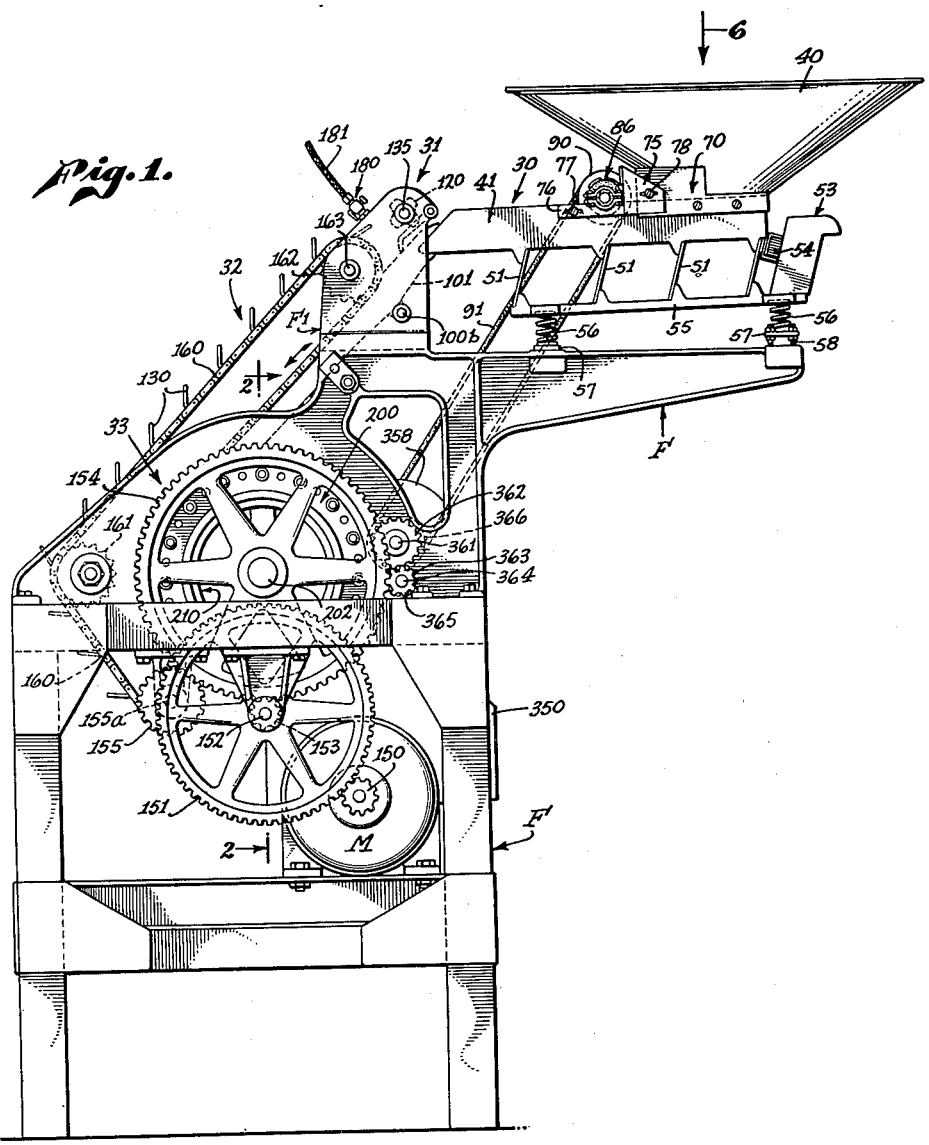
Figure 1 is a side elevation of the machine.
Figure 25:
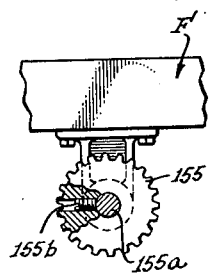
Figure 25 is a fragmentary section of the chain driving gear showing its adaptability to adjustment.
Figure 6:
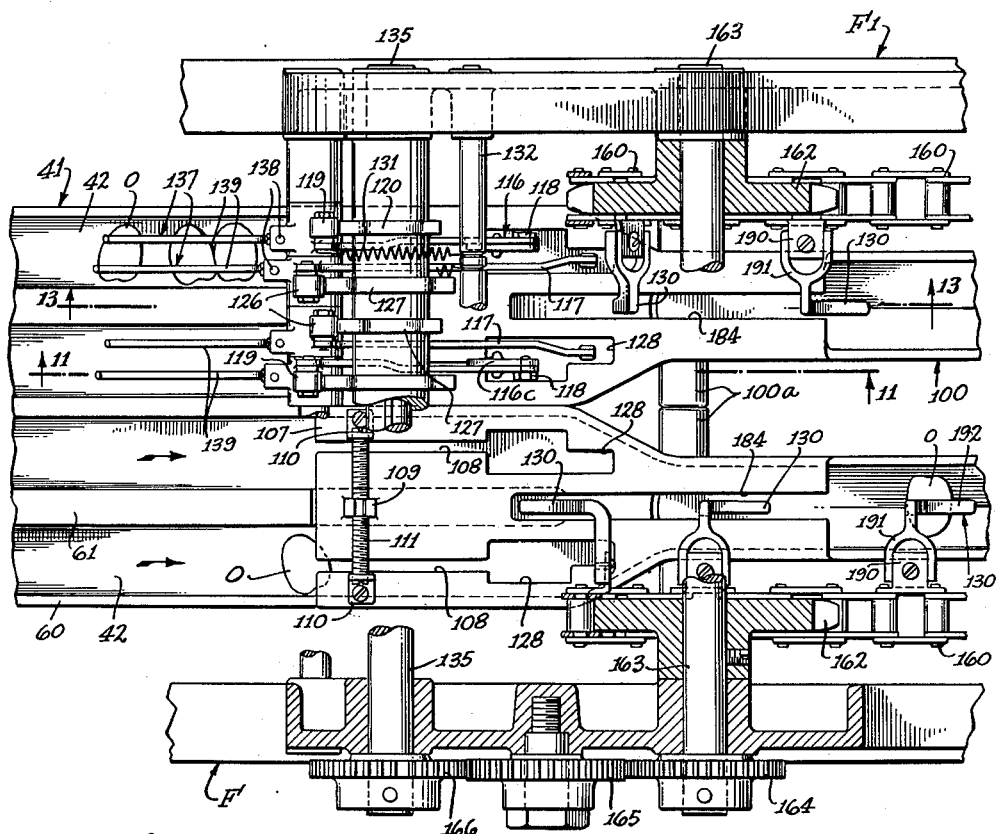
Figure 6 is a section of the metering device taken on the line 10—10 of Figure 3.
Figure 7:
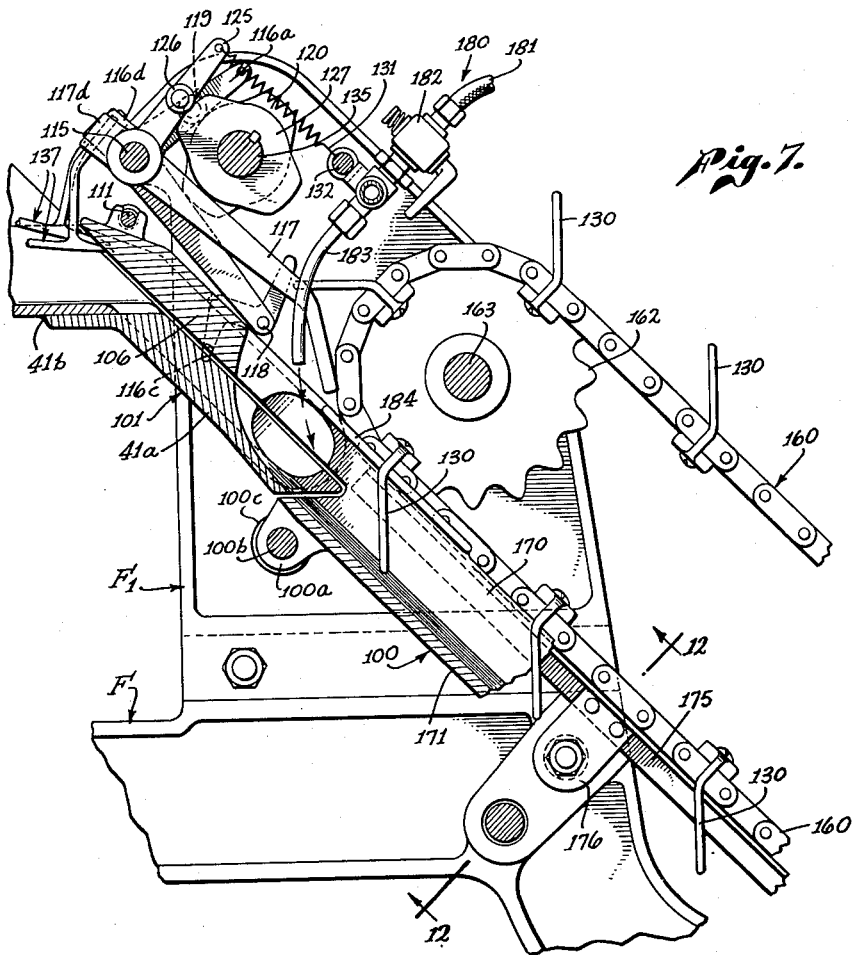
Figure 7 is an enlarged side view partly in section taken on the line 11—11 of Figure 6.
Figure 8:
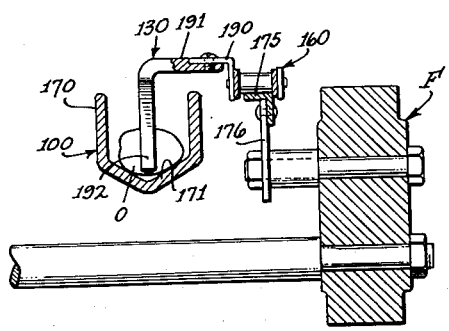
Figure 8 is a fragmentary sectional view taken on the line 12—12 of Figure 7.

Our pitting machine generally designated by the numeral 33 is shown in an environment including a feeding mechanism 30, which is being made the subject of a divisional application based upon the parent case Serial No. 322,540, and a metering device 31 and a spacing and positioning mechanism 32 being claimed in the said parent case.

The feeding device comprises a hopper 40, the lower constricted end of which communicates with a vibrating tray 41 having a plurality of delivery passages 42.

The vibrating tray is formed with relatively high side walls 60 and intermediate low walls 61 defining olive delivery passages 42. In the drawings the olives are designated O. The present machine is designed with four such delivery passages formed in the tray 41. Generally speaking, olives poured into the hopper 40 converge and descend by gravity into the four delivery passages 42.

The tray 41 is mounted upon a plurality of webs 51 carried upon a base plate 52, and vibration is imparted to the tray 41 by a vibrator 53 of any suitable design.

Vibration of the tray causes the olives to travel along the delivery passages 42 toward the metering device 31, sufficient details of which will be described to show the connection between the metering device and the pitting mechanism.

The purpose of the metering device is to receive the olives from the four delivery passages, space their subsequent travel and divert them into two inclined positioning chutes or troughs 100 which are part of the spacing and positioning mechanism 32. It has been found that four of the delivery passages are advisable to assure a continuous supply of olives to two positioning chutes.

The metering device has four similar units, one to serve each delivery passage 42a in a magazine 101 which is a subordinate part of the metering device.

The metering device includes retaining fingers 116 and holding fingers 117, each combination of which meters olives one at a time for release into the chutes 100 at a rate to deposit one olive upon each spacer 130 as the spacer passes, details of which will be later described.

Referring to Figure 1, an electric motor M is mounted on the frame F. On the shaft of the motor is a pinion 150 meshing with a gear 151 keyed to a shaft 152. On the shaft 152 is a small gear 153 which meshes with a large gear 154. This gear meshes with a large gear 154. This gear meshes with a smaller gear 155, which is adjustably locked on the shaft 155a by any suitable means, such as a setscrew 155b. There are two similar sprockets 156 fixed to the shaft 155a, one sprocket to accommodate each of a pair of endless chains 160.

As indicated, there are twin units of olive spacing and positioning mechanisms, each of which includes one of the chains referred to.

Describing only one of these elements, it will be observed that driven by the sprocket 156 is the chain 160 which travels over an intermediate sprocket 161 and an upper sprocket 162. The chain can be timed (both chains being timed as one) by loosening the set screw 155b, shifting the chain and sprocket to a desired position, and retightening the set screw. Other equivalent means for timing the power drive and chain may be employed.

The upper sprocket 162 is fixed to a shaft 163 journaled in the frame extension F1.

There is only one shaft 163, this extending across the machine and servicing both units. Power from the motor is thus transmitted through the agencies mentioned to the chains 160, and to other moving parts as will presently appear.

The spacing and positioning mechanism 32 begins at the upper end of the chute 100 and includes various associated mechanisms from that point in the travel of the olives until the olives have been seized by the punches and dies in the central part of the machine. It consists primarily of chute 100, spacing means including the spacing fingers 130 and gripping devices 193, the latter of which come into play near the lower end of the chute and cooperate to grip the olives and correctly hold them to be received by the dies.

The chutes are mounted at their upper end by means of attached bosses 100a mounted on a laterally extending bar 100b which has its end seated in lug 100c formed on the frame extension F1. This form of mounting enables the lower ends of the chute 100 to be raised and lowered for adjusting purposes to accommodate olives of different sizes.

The chutes each comprise a trough having vertical side walls 170 and a bottom 171 U shaped in cross section near the upper end and feathering into a V shaped cross section toward the lower end. The width of the trough is slightly greater than the length of the largest olives to be pitted. The trough is slotted as at 172 for a distance upward from its lower end for a purpose later disclosed.

To one side of each chute is an angle iron guide bar 175 fastened to a bracket 176 on the frame F. This guide bar furnishes a track support for the upper reach of the chain 160, the chain being aligned slightly to one side of the chute 100 and parallel thereto. The lower part of the angle iron guide bar 175 is supported upon a bracket 176a which is bolted to the frame.

The lower portion of the chute 100 is supported by means of a bracket extension 177 which is bolted to the frame F. The frame is provided with a slot 178 through which the bolt 179 passes to secure the bracket extension 177, and is adjustable in the slot to afford a limited vertical adjustment of the chute. Other equivalent means for mounting the lower end of the chute whereby its position may be adjusted, as by means of cams or the like, are considered by us to be equivalent and within the scope of our invention.

Secured to every third link in the chain is a spacer 130, previously referred to. Each spacer consists of a bracket 190 substituted for the chain link plate on one side of the chain to which bracket is screwed for lateral adjustment a member 191 set at an angle, the end 192 extending into the chute 100 and adapted to travel freely therein.

Olives descend in the chutes, rolling and sliding behind the spacers 130. The olives seek their most natural rolling position, and the concave bottom of the trough aids the olives to quickly assume such position. No matter what the position of each olive as it is released into the chute, the configuration of the bottom of the trough, and the length of travel to the end of the chute result in the olive invariably assuming a position with its longitudinal axis transverse of the chute as it approaches the lower end thereof. We prefer to employ auxiliary fluid means for hastening the alignment of the olives, but this means is not a part of the invention claimed in the present application.

The slot 172 is not wide enough to affect the movement or position of the olives. It does permit, however, the narrow gripper 193 to enter behind the olive and close in upon the same, the olive being then gripped between the gripper 193 and spacer 130. The gripper and spacer travel together in this relationship almost to the position where the olive is seized by the punch and die, whereupon the spacer travels on tangentially and the gripper is retracted.

Upon leaving the guide member 175 the chain 160 follows the contour of a drum 200 which is a part of the punch and die mechanism and is supported thereby on the peripheral track 201; having served its function the chain passes around sprocket 156 and returns over sprocket 161 to the upper sprocket 162.

The grippers 193 are intimately involved with the die and punch mechanism and will be further described in connection with the latter.

Referring now especially to Figure 2, a main shaft 202 is journaled in end bearings 203 which are carried by the frame F. This main shaft has affixed to it a gear 154 as by means of a set screw 204 and the shaft is rotated by rotation of the gear.

On the center of the shaft is keyed a disc 205 having a hub 206 and an outer section consisting of a bifurcated annular flange 207. The bifurcations of the flange are spaced apart somewhat more than the length of an olive and have regularly spaced holes 208 and 209 in a series concentric with the axis disc. The holes 208 are of a diameter large enough to accommodate the passage of a punch and small enough to bar an olive. The holes 209 are large enough to accommodate a die the outer diameter of which is slightly greater than the diameter of an olive. These holes alternate in the series and the series in alternating are offset so that holes 208 in one flange are concentric with the holes 209 in the opposite flange. This is well illustrated in Figures 2 and 10.

Except for the gear 154 and the disc 205 the die and punch units on each side of the line 16—16 of Figure 2 are twins and only one will be described in detail.

Supported within the frame F is a cam barrel 210. This cam barrel remains stationary. It provides three separate cams: an internal gripper cam 211, an external die cam 212, and an external punch cam 213.

Figure 9:
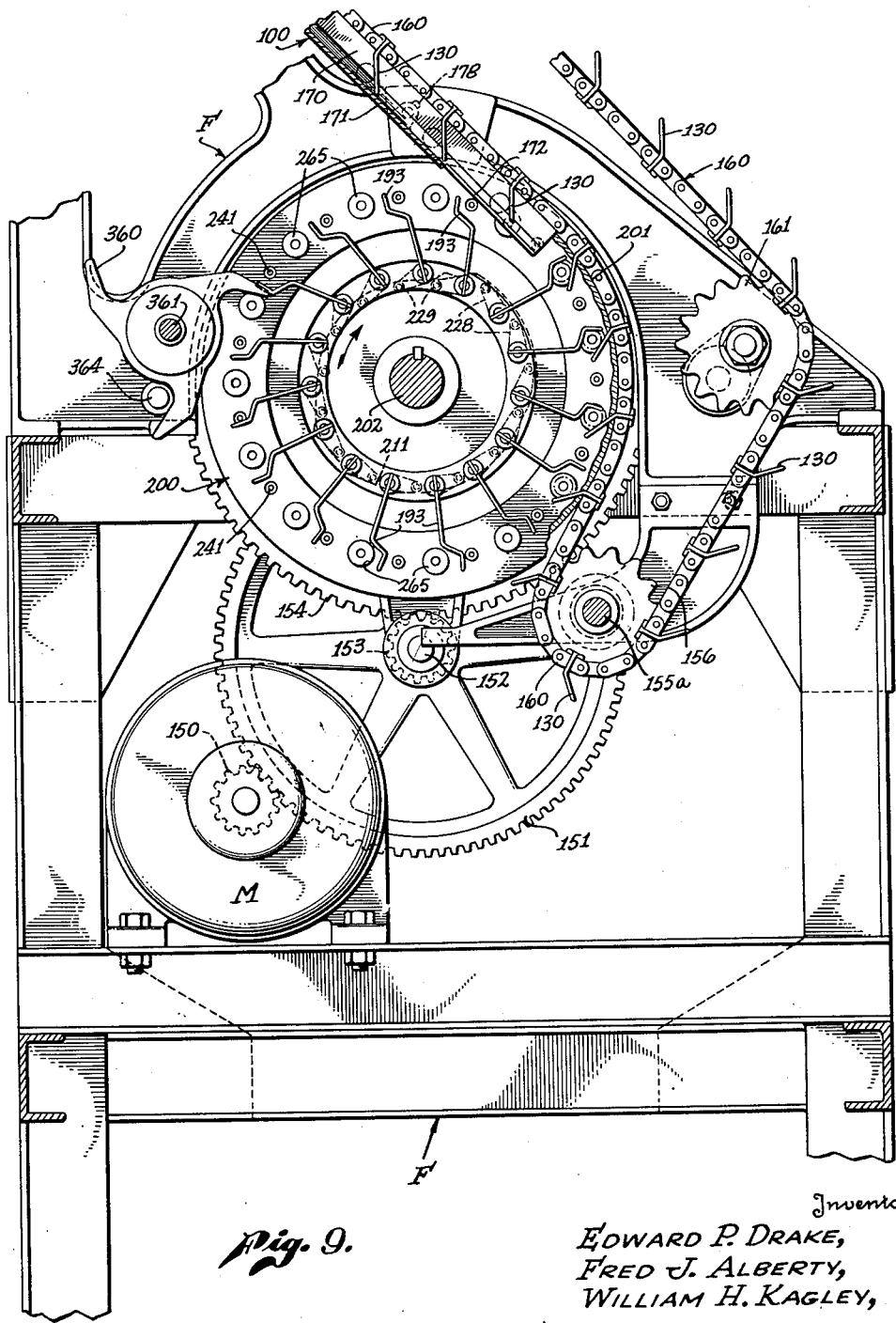
Figure 9 is a section taken on the line 15—15 of Figure 2 showing the central and lower portion of the machine.

The gripper cam 211 comprises a cam race 215 of the irregular contour illustrated formed upon the inner face of an annular flange 216 which is part of the cam barrel. The physical configuration of this race may be seen in Figure 9, and its action and relation to the die cam and punch cam is analyzed in the chart Figure 20. Its purpose is to operate and control the gripper 193.

The drum 200 is formed with an end 220 and a hub 221, the latter of which is keyed to the shaft 202 by which it is rotated. The drum includes a peripheral extension 222.

Disposed in the end 220 concentric with the axis of the drum is a series of regularly spaced bearing lugs 225. These lugs have holes machined therein to afford bearing surfaces 226 for shaft 227 of the gripper 193.

Each gripper 193 (see Figures 21 and 22) includes an extending member 193a formed with a pocket 193b secured to and arranged to be given a partial rotation by the shaft 227. At the end of the shaft opposite the member 193a is keyed a crank 228 upon which is a roller 229 adapted to follow the gripper cam race 215. A coil spring 230 is positioned upon the outer end of the shaft 227 to urge the roller 229 toward the face of the cam race 215.

Referring back to Figure 9, it will be seen that as the drum 200 rotates carrying with it the grippers 193 the rollers on the cranks of the grippers follow the cam race 215. The grippers are thus held in a retracted inactive position until reaching the slot 172 in the chute 100 at which point the cam race recedes abruptly and permits the spring 230 to urge the gripper member 193 forward against an olive which is following one of the spacers 130. The depression in the cam extends for 62° during the travel of the roller over which the die and punch have approached to seize the olive, as later described. The cam race at that point advances slightly and opens the gripper to assure that it clears the die which, as seen in the subsequent description, has moved into the region occupied by the gripper. The cam race is further advanced to move the gripper back for clearance of the punch. The cam permits this inactive of retracted position of the gripper to be maintained to the starting point described. As further particulars of the cam action are described in Figure 20 no more detailed description is deemed necessary here.

As an auxiliary feature in the operation of the grippers a stationary cooperating cam member 230 is secured to the inner face of the barrel 210 and is formed with a cam race 231 of irregular contour designed and positioned as particularly illustrated in Figure 17 to augment the action of the spring 230 by positively and abruptly forcing the rollers 229 into engagement with the cam race 215 at the point of the evolution of the travel of the grippers where they enter the slot 172, thus assuring a rapid advancement of the grippers into the proper position for engaging the olives. This eliminates any possible tendency of the gripper action at that point to be sluggish and to interfere with the orderly and rapid handling of the olives.

For an understanding of additional details of the die and punch mechanism reference should be made to Figures 12, et seq. The dies are generally designated by the numeral 240 and the punches by the numeral 241. They are all alike.

The drum 200 is formed with peripheral flanges 242, 243 and 244. A series of aligned holes 242a, 243a, and 244a are provided in these respective flanges, the first two holes to furnish a slide bearing for the die and the third one to secure a mandrel 250 of a coring tool designated generally 251. This coring tool is regarded as a part of the die assembly but as it performs certain separate functions will be separately described.

Comprising each die is an outer sleeve 252 slidably fitting in the bearing 243a. A collar 253 encloses a portion of the sleeve and is attached thereto. This collar has a rectangular shank 254 which is arranged to slide in a longitudinal guide slot 255 in the drum. Extending from the shank is a stub shaft 256 upon which is mounted a roller 257 which extends into the raceway and engages the raceway of the die cam 212 as the drum rotates carrying with it the dies 240. The roller or cam follower 257 travels through the raceway over a varying contour, as illustrated in Figure 17.

Slidably mounted within the sleeve 252 is an inner sleeve 260 which has a stop nut 261 at the rear end to abut against the end 262 of the sleeve 252. The other end of sleeve 260 extends through and beyond the end of the outer sleeve. At the forward end of the inner sleeve is threaded a die member 265, which is slidable in the flange 242. The extreme outer end of the die member 265 is countersunk to form an olive receiving cup 266. A compression spring 267 encloses that portion of the inner sleeve 260 between the rear end of the die member 265 and the collar 253 to keep these parts normally separated and to cause the die member 265 to be normally advanced upon forward movement of the collar 253 under influence of the cam 212. Retraction of the die member 265 is accomplished by engagement of the rear end 262 of the outer sleeve 252 with the nut 261 on the inner sleeve 260.

Slidably fitting in the bore of the inner sleeve 260 is the coring tool 251. This comprises a sleeve 270 mounted on a rod 271, the latter of which is provided with a head 272 fitting within an enlarged bore 273 of the forward portion of the sleeve 270 and adapted for engagement with an abutment 274 at the inner end of the enlarged bore. The rear end of the sleeve 270 is threaded into a collar 275 and the rod 271 extends on and through a pair of cooperative washers 276 by which the rod is mounted in the flange 244.

A compression spring 277 encloses the rod and extends between the inner washer 276 and the collar 275 normally urging the collar forward away from the washers 276.

At the upper part of the collar 275 is mounted a roller 280 which engages an auxiliary cam 281. It will be seen that the coring tool cannot extend forward beyond the relative position it occupies in the die illustrated in Figure 12, being restrained by the head 272 of the rod 271 engaging the shoulder 274. It may however be forced to assume a position in which it is relatively retracted with respect to the die, as in Figures 13 and 14, Figure 13 illustrating the die moved forward while the coring tool remains in substantially the same position it occupied in Figure 12.

The forward end of the sleeve 270 of the coring tool is sharpened to form a circular knife 270a which pierces the olive, making a longitudinal incision therein from the end of the olive to about the end of the seed and of diameter approximately the same as the diameter of the olive pit. This enables the pit to be cleanly pushed out of the end of the olive by the punch with a minimum of tearing of the olive due to the punching operation.

When the die is advanced to seize the olive the circular knife of the coring tool first pierces the olive and upon further pressure enters more fully to about the position illustrated in Figure 12. Further advancement of the die causes the olive receiving cup 266 to engage the olive and carry it forward longitudinally with the die from the position shown in Figure 12 to the position shown in Figure 13. In advancing, the die travels through a hole 209 in the bifurcated disc 205 so that the olive is carried into the central cavity of the disc for the completion of the pitting operation. Pits upon removal are temporarily retained in the bore 265a of the sleeve 265 so long as the die remains in advanced position and are subsequently expelled when the die is retracted as shown in Figure 15.

To make the twin units most efficient a series of dies as described is carried on each of the drums 200.

Positioned on each drum alternately with the dies is a series of the punches 241, the punches on one of the drums axially aligning with the dies on the opposite drum.

One of the punches is shown in detail in Figures 18 and 19. This one is carried on the drum opposite the drum carrying the particular die last described. The body of the punch is a plunger 300 which has a sliding fit in bearing 301 and 302 formed in the flanges 243 and 242 respectively. The plunger may be inserted or withdrawn through a hole 303 in the flange 244.

Secured to the plunger by a set screw 305 is a collar 306 having a guide shank 307 extending below to slide in a guide slot 308 in the drum similar to the slot 255. Secured in the shank is a stub shaft 309 upon which is carried a roller or cam follower 310 engaging in the raceway of cam 213. As the cam follower moves along the contour of the cam through a rotation of the drum upon which the punch is mounted the plunger is advanced and retracted. The forward end of the plunger has a tapered bore 311 into which is driven the shank 312' of a tip 312. A hole 313 is provided for driving out the tip when disassembling. The tip is preferably made of metal having some spring characteristic so that it will spring rather than break if forcibly deflected by an olive pit. While not necessary, it is somewhat advantageous to make the end of the tip slightly cupped. Such a form serves better than a flat end in attacking the pit. The tip is formed with barb 315 which will easily penetrate the olive, but will offer some resistance to the olive being withdrawn. This is for the purpose of removing the olive from the die after the pit has been punched out. When, however, the olive encounters one of the flanges 207 and the punch is further retracted the olive is stripped off and falls into a hopper (later described) or optionally upon a traveling belt or any other form of collecting device. Pits fall into a separate hopper or collecting device.

If for any reason an olive should be turned in the gripper or die and be presented with its longitudinal axis across the die and punch the punch penetrates only part way through the olive at which time it presses the pit against the knife of the coring tool. Continued pressure results in the coring tool yielding by reason of the spring 277 and the die itself will yield by compression of the spring 267 thus preventing the parts from breaking; and the tip does not under such circumstances enter into the olive far enough for the barb to take hold. The coring tool retains the olive and upon retraction the olive is knocked from the coring tool, the parts being in the position shown in Figure 15, and the olive falls with the pits. Thus only pitted olives are deposited in the receptacle intended for them.

A study of Figures 11 and 20 will reveal in more detail the die and punch movement. The cam barrels are stationary and the drums rotate so that the pitting operation may be completed at the lower part of the cycle. In tracing movement of the dies and punches it is necessary to follow the die and die cam on one of the drums and the corresponding punch and punch cam on the other drum. As well as illustrating all of the dies and punches Figure 11 may be read to show the progressive travel of any one die and punch which will next be described.

In position 325 the die and punch cams are at dwell, and the die and punch retracted. At 326 the die remains retracted and the punch has just started forward. At 327 the die continues to remain in retracted position and the punch is sharply advancing toward the die. At 328 the die has made a partial advance and the punch is nearing its forward peak of travel and is almost to the point of spearing the olive. At 329 the die is on its first step of forward movement where the coring tool has penetrated the olive, as illustrated in more detail in Figure 12. At this point the punch is at its extreme forward position and has entered the olive from the opposite end and engaged the pit. At position 330 the die is advancing further and the operation is approaching that of the details illustrated in Figure 13. The exact operation illustrated in Figure 13 occurs at the position 331 of Figure 11, this being the peak of the forward movement of the die and consequently the end of the relative mutual advance of die and punch. The pit has been ejected from the olive and remains lodged in the bore 265a of the die sleeve 265. It will be noted that the coring tool has been advancing with the die from the position 325 to the position 329 but that it does not make any further advance, remaining in the same relative location through positions 329, 330 and 331. This retention of the coring tool in that position affords ample space in the bore 265a for reception of the pit as the die advances to complete the pitting operation.

The die continues its retraction through the position 332 to the position 333 where it temporarily levels off.

At the position 334 the die starts its final state of retraction which is reached at 335 and continues to the point of starting 325.

Between the positions 332 and 333 the punch bearing the impaled olive begins to retract, and at 333 both olive and punch are entirely free of the die. At 334 the punch having continued its retraction has discharged the olive by action of the olive contacting the flange 207, whereupon the olive drops by gravity into the hopper or other receptacle provided for it.

Returning to the position 331, which is shown in detailed section in Figure 13, substantially simultaneously with the commencement of retraction of the die the roller 280 governing the position of the coring tool comes into engagement with the cam 281, and under the cam action the coring tool is abruptly withdrawn into the position 332 shown in detail in Figure 14. This rapid withdrawal of the coring tool causes a partial vacuum in the bore 265a exerting a stronger influence on the olive pit than does the temporary suction resulting from separation of the olive and the olive cup. The pit is thus assured of being retained in the bore until the drum has rotated to the point where it is intended that the pit shall be discharged. The coring tool is held in this retracted position by the cam 281 until the die has been completely retracted which is at the position 335. At this time the die has shifted far enough back so that the nut 261 at the rear end of the die is brought into thrust engagement with the collar 275, resulting in the coring tool thus being held in its fully retracted position until it is again called into play at the position 328 in the cycle of operations.

The ejection of the pit occurs as the die reaches position 335 (Figure 15), which it will be recalled is the fully retracted position of the die, and at which time the sleeve 260 has been slid back on the coring tool so that the forward end of the coring tool is flush with the end of the olive receiving cup. In this position the plunger 272 of the coring tool assembly is positioned relatively forward in the coring tool sleeve 270 and in cooperation with the sleeve of the coring tool serves to eject the pit which falls by gravity into the hopper or other receptacle intended for pits.

Figure 10:
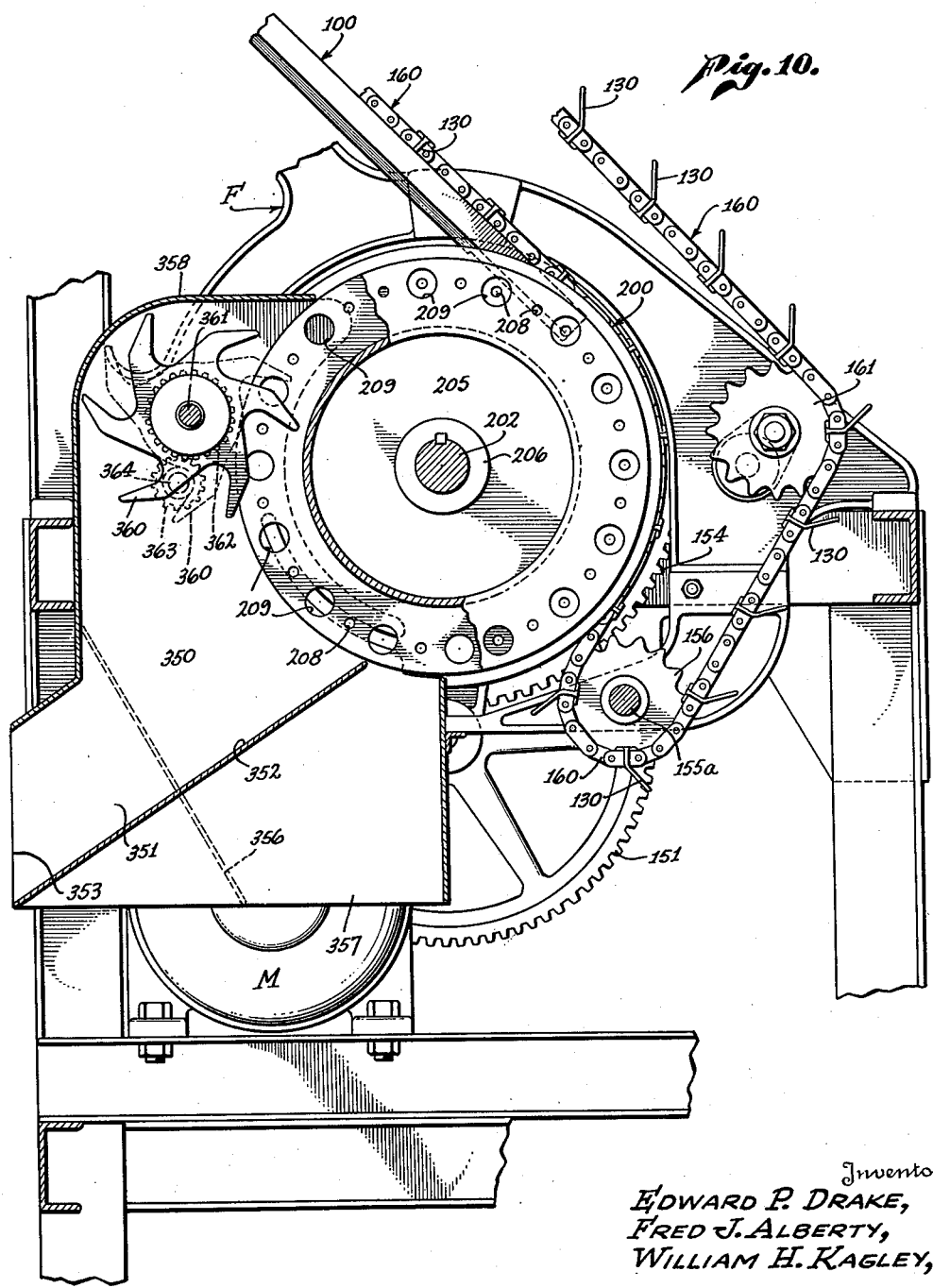
Figure 10 is a similar view taken on the line 16—16 of Figure 2.
Figure 26:
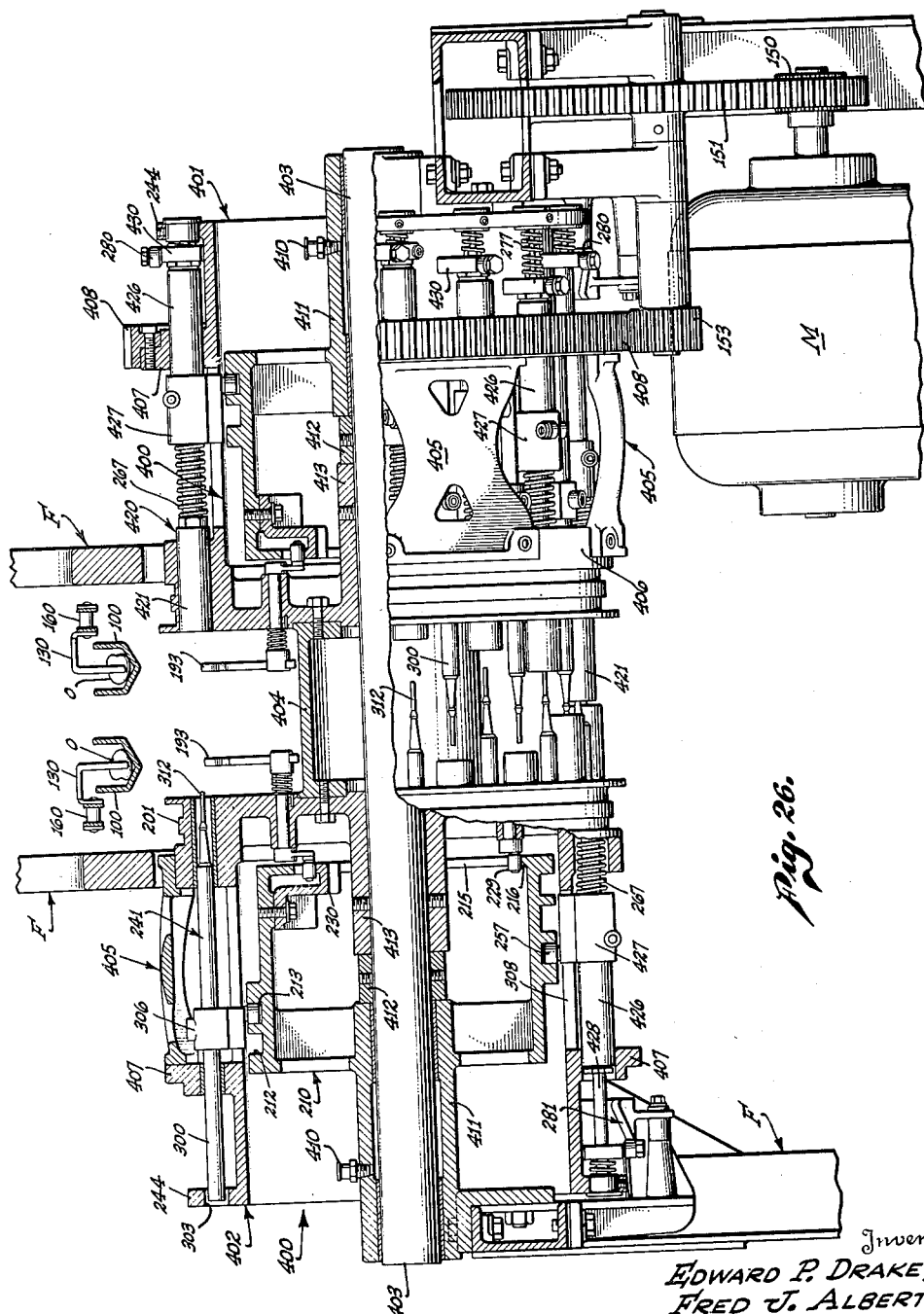
Figure 26 is a view similar to Figure 2 illustrating a modified form of the machine.

The hopper for receiving the pitted olives is numbered 250 (see Figures 2 and 10). It is formed with side walls 351 which are parallel and which are spaced apart slightly more than the width of the bifurcated flanges 207 of the disc 205. Preferably they are caused to lie immediately adjacent to the outer faces of the flanges as shown in Figure 2 and to follow the general contour of the segmental part of the flanges to which they are adjacent as shown in Figure 10. There is an inclined bottom 352 which leads down to a discharge opening 353 which may communicate with a barrel, a traveling belt, or any other desired collecting device.

Two pit hoppers are provided numbered 354. The walls 351 of the olive hopper form the inner walls of the pit hoppers, and the outer walls 355, together with inclined bottoms 356, complete the pit hoppers, which discharge through openings 357 into a bin, a traveling belt or any other desired collecting device.

It is advantageous although not absolutely essential, to provide a common cover 358 over the hopper assembly. Such a cover insures that the olives and pits if thrown outwardly from the dies and punches will be deflected down into their proper discharge channels and also contribute cleanliness to the general operation of the machine.

An auxiliary device for insuring that olives and pits are stripped from the dies and punches is shown particularly in Figures 2 and 10. This comprises star wheels 360 mounted on a shaft 361 which is journaled on the frame. It is preferable to locate a pair of such star wheels within the flanges 207 for the purpose of stripping off any olives which may have adhered to the flanges, and one star wheel adjacent to the end of each drum 220 for the purpose of stripping off any pits which may have adhered to the punches. The shaft 361 is keyed to a small gear 362 which meshes with a gear 363 fixed to shaft 364, the latter being driven by a gear 365 which meshes with a large gear 154.

At the end of shaft 361 is a pulley 366 over which is trained the belt 91 which drives the roller 86.

In operation, the olives from bulk are delivered to the hopper, and pass through the vibrating tray, and are metered into the chutes. At the lower end of the chutes the grippers on the drum cooperate with the spacers to hold the olives and bring them into line with the punches and dies. The olives are seized by the knife end of the coring tools advancing in succession as the drums rotate, and are speared by the punches and finally clamped in the olive receiving cups at the ends of the dies. The grippers having performed their chief function are held back by the gripper cam as their revolution on the drum carries them successively around to the point of starting. The dies advance against the punches to push out the pits. The pits are retained in the bores of the sleeves 265, the lodgement of the pits in the bores being assisted or assured by the rapid retraction of the coring tools creating a vacuum or suction acting on the pit. The ejection of the pits occurs upon complete retraction of the dies, while the coring tools remain stationary with the plungers therein fully extended, and the pits are thus left without support, and are stripped off upon striking the forward ends of the coring tools.

Pitted olives being temporarily impaled on the punches are stripped off by the flanges 207 and fall by gravity into the olive receiving hopper. Pits remain in the dies, as previously described, during a brief continuation of the cycle and are discharged as described into the pit hoppers.

One of the very important features of the present invention is its adaptability to different sized olives. A few relatively minor adjustments can be made on the machine quickly and easily to accommodate whatever size olives comprises the next batch to be run through. It is not, of course, contemplated that this machine can practically operate on a batch of olives of assorted sizes. It is, however, common practice in the handling and packing of all fruits, and especially of olives, to grade them into sizes of uniform dimensions before cooking, packing or curing them. In the case of olives, the longitudinal dimension is ignored, although as a general rule olives having the same transverse diameter will have the same length.

The spacers 130 require no adjustment relative to the chain on which they are mounted. They do require, however, to be slightly advanced so that when the spring operated grippers come into play to hold the olives against the spacers the longitudinal axis of the olives will be aligned with the axes of the punches and dies. The timing is done by loosening the set screw 155b, in gear 155, slightly rotating the sprocket 156 by hand to the desired point, and re-tightening the set screw 155b. See Figure 31.

It is also necessary in case of the larger olives to slightly lower the lower end of the inclined chute 100. This is accomplished by loosening the bolt or screw 179 and shifting the chute downwardly in the slot 178, then tightening the bolt. It will be recalled that the upper ends of the chutes are pivotally mounted on the cross bar 100b to facilitate the adjustment last described.

We have devised a novel adjusting tool which is separately illustrated in Figure 23. It consists of a metal member 375 having the physical proportions of an olive and is provided with cylindrical nipples 376 at each end of the longitudinal axis thereof. A handle 377 attached to the body 375 at an angle facilitates the use of the device. We provide a series of these tools corresponding to the different grades or sizes of olives which are to be handled in the machine.

The tool is used in the manner illustrated in Figure 21. By grasping the handle of the tool, the simulated olive is placed in position between the spacer 130 and the finger 193. The nipples 376 are held in alignment with the axes of a cooperating punch and die and while so held, the chutes are adjusted as described, and the chain may be then turned as described so that the combined action of the spacer and finger will hold the olive in the correctly aligned position.

It is not necessary to make any change in the dies or punches because as previously pointed out the olive receiving cups in the ends of the dies have a universal configuration and are large enough to hold any of the olives which will be normally handled by this machine. The punches having a linear reciprocal motion do not require , any adjustment. As the action of the various cams both on the metering mechanism and in the die and punch mechanism perform their cycles of operation independently of the size of fruit going through the machine they require no adjustment.

Obviously if olives smaller than that contemplated in the principal description of this invention is to comprise the next batch going through the machine, the same parts which have been described as being readjusted for larger olives would have to be readjusted in the opposite direction or manner for the smaller olives.

In the modifications shown in Figures 26 to 33, it is to be assumed that the olive feeding, metering and positioning means are the same as previously described, or equivalent.

The drum 400 comprises similar parts 401 and 402 locked on the shaft 403, and interconnected by a central member 404. (Our bifurcated flange 205 is eliminated.) We have also provided torque plates 405 between the annular bosses 406 and 407. A gear 408 is mounted on one part 401 of the drum, so that power from the motor M is conveyed to the periphery of the drum. The central member 404 and the torque plates 405 make the drum assembly substantially rigid, so that in rotating, the opposed parts of the drum are not deformed or misaligned by torsional stress.

We provide lubricating means 410 for the shaft 403 and bearings 411, and spacers 412 between the drum hubs 413 and the inner ends of the bearings.

Referring to Figure 27, we have secured a rubber or other resilient edging 415 to the arcuate slotted members 416 at the mouth of the olive receiving hopper. These slotted members are positioned so that the punches enter them as the olive stripping function begins. The punches continue to retract after so entering, and olives remaining impaled on the punches are stripped off by the resilient edges of the members 416. Any pits which have adhered to the dies are stripped by a flexible stripper 417.

Referring to Figures 28 to 33, we show an improved form of die 420, which may be removed outwardly from the drum for repair or replacement. In this form the die member 421 is silver soldered at 422 to the sleeve 423, the latter being threaded at 424 for engagement with the nut 425. The outer sleeve 426 fits over the sleeve 423, and is in turn secured to the split block 427 by a screw 427a.

The coring tool sleeve 428 is sharpened with a taper from the outside, as this has been found to cut an incision in the olives enabling the pits to be more cleanly freed and expelled.

The sleeve 428 is threaded at its opposite end into a nut 429, the outside of this nut being threaded into the split collar 430. The coring tool rod 431 is threadedly mounted in a cap 432, aided by a locking nut 433. This cap is retained in the flange or annular boss 244 by a screw 434.

The operation of this die is substantially the same as the form shown in Figures 12 to 15, previously described in detail. However, it is more readily removed and replaced. The rod 431 may be unscrewed and slid out the front. The screw 435 (see Figure 32) may be loosened, and the nut 429 removed. The cap 432 is removed and with it the spring 277. The collar 430 can then be slipped out. If the screw 428a is removed, the remaining parts of the die may be slid backwardly, and through the hole 244a.

What we claim as our invention is:

1. In a fruit pitting machine having means to deliver individual pieces of fruit into a position where the center thereof is aligned in a predetermined position between a die and punch, a die formed with a fruit receiving cup to receive the fruit, and having a bore for temporary lodgment of the pit of the fruit, a punch aligned with the die adapted to engage the pit of the fruit, means to relatively advance the die and punch to eject the pit from the fruit into the bore of the die, a coring tool slidable within the die having a knife extensible into the fruit receiving cup for making an incision in the end of the fruit, and retractable within the die to make room for the pit within the bore of the die, and means extending and retracting the knife in timed relation to the movements of the die and punch for the purposes described.

2. In a fruit pitting machine having means to deliver individual pieces of fruit into a position where the center thereof is aligned in a predetermined position between a die and punch, a die formed with a fruit receiving cup to receive the fruit, and having a bore for temporary lodgment of the pit of the fruit, a punch aligned with the die adapted to engage the pit of the fruit, means to relatively advance the die and punch to eject the pit from the fruit into the bore of the die, a coring tool slidable within the die having a circular knife extensible into the fruit receiving cup for making an incision in the end of the fruit, and retractable within the die to make room for the pit within the bore of the die, means extending and retracting the knife in timed relation to the movements of the die and punch for the purposes described, the coring tool including a plunger slidably fitting within the knife, and means to reciprocate the knife on the plunger to create a periodic suction in the bore of the die.

3. In a fruit pitting machine having means to deliver individual pieces of fruit into a position where the center thereof is aligned in a predetermined position between a die and punch, a die formed with a fruit receiving cup to receive the fruit, and having a bore for temporary lodgment of the pit of the fruit, a punch aligned with the die adapted to engage the pit of the fruit, means to relatively advance the die and punch to eject the pit from the fruit into the bore of the die, a coring tool slidable within the die having an end extensible into the fruit receiving cup, the coring tool comprising a cylindrical knife and a plunger slidably fitting within the cylindrical knife and forming a substantially solid end on the coring tool when the knife is retracted, means to advance the knife into the fruit receiving cup at one point in the cycle of the pitting operation for causing the knife to make an incision in the fruit and retracting the knife at another point in the cycle of the pitting operation, means to retract the die to a pit ejecting position in which the coring tool with its parts in the last described relationship extends into the fruit receiving cup whereby the pit is knocked out of the cup.

4. A fruit pitting machine comprising: a traveling die and punch carrier providing supporting means for an aligned die and punch, a die slidably mounted on the carrier, and an aligned punch mounted on the carrier and adapted to travel synchronously with the carrier, a cam in juxtaposition to the path of travel of the carrier, a cam follower on the die engaging the cam and causing the die to advance into fruit engaging position during a given period in the cycle of the carrier, a coring tool in the die adapted to initially advance with the die and to make an incision in the fruit, the said cam causing the die to further advance into pit ejecting position, and means to restrain the coring tool when the die is being so further advanced.

5. A fruit pitting machine comprising: a traveling die and punch carrier providing supporting means for an aligned die and punch, a die slidably mounted on the carrier, and an aligned punch mounted on the carrier and adapted to travel synchronously with the carrier, a cam in juxtaposition to the path of travel of the carrier, a cam follower on the die engaging the cam and causing the die to advance into fruit engaging position during a given period in the cycle of the carrier, a coring tool in the die adapted to initially advance with the die and to make an incision in the fruit, the said cam causing the die to further advance into pit ejecting position, means to restrain the coring tool when the die is being so further advanced, and means to retract the coring tool at a period in the cycle succeeding the pit ejecting position.

6. In a fruit pitting machine: a die comprising a sleeve having a fruit engaging member, a coring tool sleeve slidable within the bore of the first said sleeve and having a fruit cutting end, a plunger slidable within the coring tool sleeve, means advancing both said sleeves into fruit engaging and said first sleeve only into pit ejecting positions, the said plunger restraining the coring tool sleeve while the first named sleeve is advancing into the said pit ejecting position.

7. In a fruit pitting machine: a die comprising a sleeve having a fruit engaging member, a coring tool sleeve slidable within the bore of the first said sleeve and having a fruit cutting end, a plunger slidable within the coring tool sleeve, means advancing both said sleeves into fruit engaging and said first sleeve only into pit ejecting positions, the said plunger restraining the coring tool sleeve while the first named sleeve is advancing into the said pit ejecting position, and means retracting the coring tool sleeve in the cycle of operation succeeding the pit ejecting position thereby causing a partial vacuum in the bore when the fruit engaging member is closed by a piece of fruit.

8. A fruit pitting machine comprising: an aligned die and punch, said die being formed with a straight tapered countersunk fruit receiving end adapted to engage fruit of different sizes, a bore to receive the pits from such fruit, a sharpened coring tool slidable within the said bore to make an incision in the fruit in alignment with the pit thereof, and means for advancing the fruit receiving end of the die while restraining the coring tool.

9. In a fruit pitting machine, a shaft, opposite die and punch carrying drum sections mounted on the shaft and spaced apart to accommodate mutual advance of dies and punches, means to rotate one of the drum sections, and a central joining member radially spaced from the shaft rigidly connecting one drum section to the other independently of the shaft.

10. In a fruit pitting machine, a traveling die and punch carrier, fruit engaging dies and oppositely disposed punches mounted on the carrier, means to advance the punches in synchronism with the travel of the carrier as part of a pit ejecting operation and to retract the punches with pitted fruit impaled thereon, fruit stripping means comprising a member having an arcuate slot open at one end adapted to permit the punches to enter transversely and sufficiently narrow to restrain fruit upon retraction of the punches.

11. A device as described in claim 10 in which the slot is defined by a resilient material.

12. In a fruit pitting machine, a rotatable drum provided with longitudinally spaced radial flanges, a fruit engaging die comprising a die sleeve slidably mounted in one flange and a coring tool rod within the die sleeve detachably mounted in the other flange, a coring tool sleeve slidably interposed between the die sleeve and the rod, and means for independently actuating the die sleeve and coring tool sleeve to advance and retract.

13. In a fruit pitting machine, a rotatable drum provided with longitudinally spaced radial die mounts, a fruit engaging die comprising a die sleeve slidably mounted in one die mount and a coring tool rod within the die sleeve detachably mounted in the other die mount, a coring tool sleeve slidably interposed between the die sleeve and the rod, and means for independently actuating the die sleeve and coring tool sleeve to advance and retract.

14. In a fruit pitting machine, a rotatable drum provided with longitudinally spaced radial flanges, a fruit engaging die comprising a die sleeve slidably mounted in one flange and a coring tool rod within the die sleeve detachably mounted in the other flange, a coring tool sleeve slidably interposed between the die sleeve and the rod, and means for independently actuating the die sleeve and coring tool sleeve to advance and retract, said means for actuating the die sleeve comprising a cam, and a cam follower detachably connected to the die sleeve.

15. In a fruit pitting machine, a rotatable drum provided with longitudinally spaced radial flanges, a fruit engaging die comprising a die sleeve slidably mounted in one flange and a coring tool rod within the die sleeve detachably mounted in the other flange, a coring tool sleeve slidably interposed between the die sleeve and the rod, and means for independently actuating the die sleeve and coring tool sleeve to advance and retract, said means for actuating the die sleeve comprising a cam, and a cam follower detachably connected to the die sleeve, and said means for actuating the coring tool sleeve comprising a cam, and a cam follower detachably connected to the coring tool sleeve.

16. A device as described in claim 15 in which the cam followers and coring tool rod mounting when detached permit removal of the die from the drum longitudinally in the direction of retraction of the die sleeve.

17. In a fruit pitting machine, a shaft, opposite die and punch carrying drum sections mounted on the shaft and spaced apart to accommodate mutual advance of dies and punches, means to rotate one of the drum sections, and a central joining member rigidly connecting one drum section to the other, each drum section including longitudinally spaced radial flanges, and torque plates interconnecting the flanges to reduce tendency toward tortional misalignment of the drum sections.

18. In a fruit pitting machine, a die formed with a straight tapered fruit receiving mouth adapted to engage fruit of different sizes and a bore large enough to accommodate passage of pits ejected from said fruit but not large enough to pass said fruit, and a punch adapted to advance in alignment with said die and cooperating with said die to eject the pits through said bore.

19. In a fruit pitting machine, a die formed with a straight tapered fruit receiving mouth adapted to engage fruit of different sizes and a bore large enough to accommodate passage of pits ejected from said fruit but not large enough to pass said fruit, a punch adapted to advance in alignment with said die and cooperating with said die to eject the pits through said bore, and spring means acting on said die in opposition to said punch when advancing.

EDWARD P. DRAKE.
FRED J. ALBERTY.
WILLIAM HERBERT KAGLEY.